(12) United States Patent
Ackerson et al.

(10) Patent No.: US 10,611,966 B2
(45) Date of Patent: Apr. 7, 2020

(54) PYROLYSIS REACTOR SYSTEM AND METHOD

(71) Applicants: Michael D. Ackerson, Elkins, AR (US); Michael Steven Byars, Fayetteville, AR (US)

(72) Inventors: Michael D. Ackerson, Elkins, AR (US); Michael Steven Byars, Fayetteville, AR (US)

(73) Assignee: Duke Technologies, LLC, Fayetteville, AR (US)

( * ) Notice: Subject to any disclaimer, the term of this patent is extended or adjusted under 35 U.S.C. 154(b) by 0 days.

(21) Appl. No.: 15/922,304

(22) Filed: Mar. 15, 2018

(65) Prior Publication Data

US 2018/0371322 A1  Dec. 27, 2018

Related U.S. Application Data

(60) Provisional application No. 62/522,874, filed on Jun. 21, 2017.

(51) Int. Cl.
*B01J 8/08* (2006.01)
*C10B 53/02* (2006.01)
(Continued)

(52) U.S. Cl.
CPC ............ *C10B 53/02* (2013.01); *B01D 5/0027* (2013.01); *B01D 5/0048* (2013.01);
(Continued)

(58) Field of Classification Search
CPC ....... B01J 8/08; B01J 8/06; B01J 8/065; B01J 8/085; B01J 8/10
(Continued)

(56) References Cited

U.S. PATENT DOCUMENTS 2,983,653 A    5/1961   Danulat et al.
3,853,498 A   12/1974   Bailie
(Continued)

FOREIGN PATENT DOCUMENTS

WO    2009138757 A2    11/2009

OTHER PUBLICATIONS

Sinha, S. et al., Modelling of Pyrolysis in Wood: A Review, Department of Mechanical Engineering, Indian Institute of Technology, 2010, pp. 1-17, Hauz Khas, New Delhi—110016, India.
(Continued)

*Primary Examiner* — Thuan D Dang
(74) *Attorney, Agent, or Firm* — Grady K. Bergen; Griggs Bergen LLP

(57) ABSTRACT

A system and method for the pyrolysis of a pyrolysis feedstock utilizes a pyrolysis reactor having a pyrolysis conduit and a solids return conduit segment. Each segment is configured with an outlet and an inlet to receive and discharge solid materials that are circulated through the reactor through the different segments. A solids conveyor is disposed within the pyrolysis conduit segment to facilitate conveying solid materials from the solids inlet upward through the pyrolysis conduit segment toward the solids discharge outlet. A pyrolysis feedstock is introduced into the pyrolysis reactor and at least a portion of the feedstock is converted to pyrolysis gases within the pyrolysis conduit segment, which are discharged through a gas outlet.

22 Claims, 7 Drawing Sheets

(51) Int. Cl.
| | |
|---|---|
| *B01D 5/00* | (2006.01) |
| *B01J 8/00* | (2006.01) |
| *B01D 33/27* | (2006.01) |
| *C10J 3/66* | (2006.01) |
| *C10K 1/18* | (2006.01) |
| *C10G 2/00* | (2006.01) |
| *C10B 49/16* | (2006.01) |
| *C10K 1/08* | (2006.01) |
| *C01B 3/36* | (2006.01) |
| *C10K 1/02* | (2006.01) |

(52) U.S. Cl.
CPC ......... *B01D 5/0069* (2013.01); *B01D 5/0075* (2013.01); *B01D 33/27* (2013.01); *B01J 8/003* (2013.01); *C01B 3/36* (2013.01); *C10B 49/16* (2013.01); *C10G 2/33* (2013.01); *C10J 3/66* (2013.01); *C10K 1/026* (2013.01); *C10K 1/08* (2013.01); *C10K 1/18* (2013.01); *B01D 5/0087* (2013.01); *C01B 2203/025* (2013.01); *C01B 2203/0272* (2013.01); *C01B 2203/062* (2013.01); *C01B 2203/0872* (2013.01); *C10G 2300/1011* (2013.01); *C10G 2400/08* (2013.01); *C10J 2300/0906* (2013.01); *C10J 2300/0926* (2013.01); *C10J 2300/1637* (2013.01); *C10J 2300/1861* (2013.01)

(58) Field of Classification Search
USPC ..... 585/240, 241, 242; 422/164, 184.1, 232, 422/233
See application file for complete search history.

(56) References Cited

U.S. PATENT DOCUMENTS

| | | |
|---|---|---|
| 4,891,459 A | 1/1990 | Knight et al. |
| 5,411,714 A | 5/1995 | Wu et al. |
| 5,792,340 A | 8/1998 | Freel et al. |
| 6,048,374 A | 4/2000 | Green |
| 7,943,014 B2 | 5/2011 | Berruti et al. |
| 2007/0190643 A1 | 8/2007 | Noll |
| 2008/0006519 A1 | 1/2008 | Badger |
| 2010/0261895 A1* | 10/2010 | Noll .................. B09B 3/00 536/127 |
| 2012/0028338 A1 | 2/2012 | Bhatnaagar et al. |
| 2012/0228112 A1* | 9/2012 | Steele .................. C10B 7/10 201/10 |
| 2015/0051428 A1 | 2/2015 | Dayton et al. |
| 2016/0326439 A1 | 11/2016 | Vanttinen et al. |

OTHER PUBLICATIONS

International Search Report and Written Opinion of the International Search Authority (ISA/US) dated Nov. 5, 2018 in counterpart International PCT Patent Application No. PCT/US2018/038770.

* cited by examiner

PYROLYSIS REACTOR SYSTEM AND METHOD

CROSS-REFERENCE TO RELATED APPLICATIONS

This application claims the benefit of U.S. Provisional Patent Application No. 62/522,874, filed Jun. 21, 2017, which is incorporated herein by reference for all purposes.

TECHNICAL FIELD

The present invention relates to pyrolysis reactor systems and methods of pyrolyzing biomass and hydrocarbons.

BACKGROUND

Pyrolysis is a process wherein organic material is heated at high temperatures in an oxygen-free environment to convert the organic material to pyrolysis products. In the case of biomass, the pyrolysis products include non-condensable gases (e.g., $H_2$, $CO_2$, CO, and $CH_4$), condensable gases that can be condensed to form pyrolysis oils or bio-oils, and pyrolysis solids, such as ash and char.

While pyrolysis systems for converting biomass and hydrocarbons to pyrolysis products are known, improvements in these systems are desired.

BRIEF DESCRIPTION OF THE DRAWINGS

For a more complete understanding of the particular embodiments of the invention, and the advantages thereof, reference is now made to the following descriptions taken in conjunction with the accompanying figures, in which.

DETAILED DESCRIPTION

Figure 1:
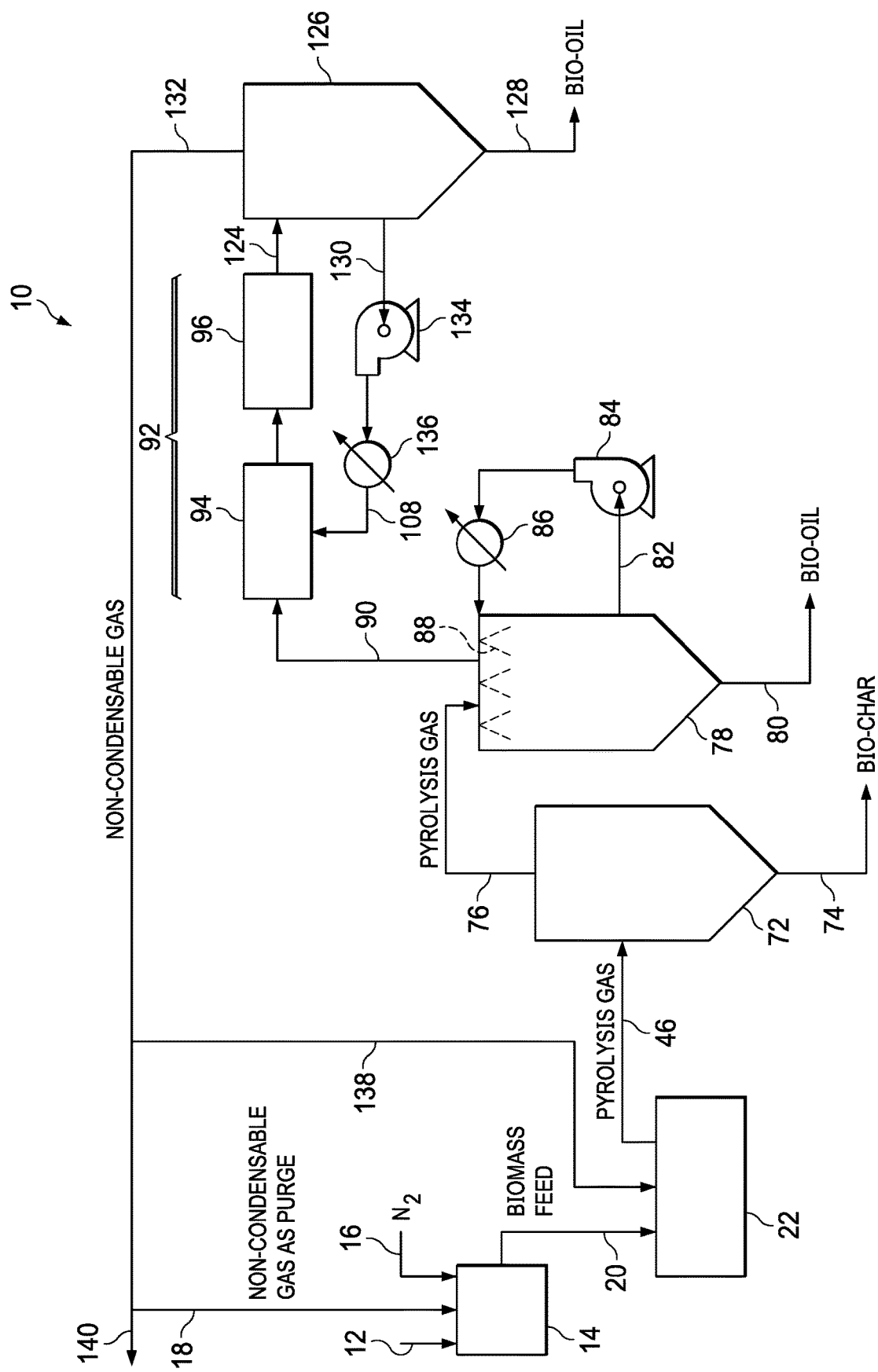
FIG. 1 is a schematic flow diagram of a pyrolysis reactor system configured in accordance with particular embodiments of the invention.

Referring to FIG. 1, a schematic flow diagram of a pyrolysis reactor system 10 is shown. The system 10 is used in the conversion of pyrolysis feedstocks. The pyrolysis feedstock may be biomass material, petroleum-based materials (e.g., oil and natural gas, plastics, waste tires, etc.), and/or non-biomass, non-petroleum-based materials (e.g., coal) and/or combinations of these materials. The biomass materials may include vegetable, animal, and cellulosic materials, and combinations of such materials. In particular embodiments, the biomass feedstock may be a cellulosic material. While the reactor system and method described herein have particular applicability to the pyrolysis of biomass materials, it could also be used for non-biomass materials, such as petroleum-based hydrocarbons and non-petroleum-based hydrocarbons. Thus, while particular embodiments described herein may relate to the pyrolysis of biomass materials, it should be apparent to those skilled in the art that it may have applicability to non-biomass materials, as well.

Particularly well suited for conversion in the pyrolysis reactor system 10 is wood sawdust. Wood sawdust is a cellulosic biomass material that is readily available in small particle sizes, often as a waste product from lumber mills, etc. The wood material may be a hardwood (e.g., oak, maple, etc.) or softwood (e.g., pine, cedar, etc.) wood species. Such wood materials are typically composed of about 50% cellulose, with the other constituents being hemicellulose and lignin in roughly equal amounts, all based upon the dry weight of the wood. Other plant materials that may be used as a biomass material for pyrolysis are typically composed of these materials as well, although the proportions of each of these constituent materials may vary. The pyrolysis feed material may be particles that are screened to the desired size prior to introduction into the pyrolysis reactor. These may be screened to particle sizes of ¼ inch or ⅛ inch or less.

The biomass or other pyrolysis feedstock will typically be a dry feed, with low moisture (i.e., water) content. Low moisture content allows the feedstock to be more quickly pyrolyzed, with the majority of the heat input being used for pyrolysis instead of for driving off any moisture present in the feed. This is beneficial in that it results in shorter pyrolysis times. Short pyrolysis times followed by rapid condensation, all within 2 seconds or less, results in less of the gaseous pyrolysis products breaking down, which in turn results in more pyrolysis oil being produced. Accordingly, in many applications the pyrolysis feedstock will have a moisture ($H_2O$) content of not more than 5% or at the most 10% by total weight of the feed. In many instances, the moisture content will be from 5%, 4%, 3%, 2%, or 1% or less by total weight of the feedstock. In particular applications, the moisture content of the feedstock will be from 2% or 1% or less by total weight of the feedstock.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or refer to, it is to be understood that the inventors appreciate and understands that any and all points within the range are to be considered to have been specified, and that inventors possesses the entire range and all points within the range.

As shown in FIG. 1, the pyrolysis feedstock 12, which may be a biomass feedstock, such as wood sawdust (e.g., pine sawdust), is feed into a feed bin or hopper 14. Because the pyrolysis reaction takes place without the presence of molecular oxygen or oxygen gas ($O_2$), the feedstock 12 is purged or blanketed with an oxygen-free gas to displace or remove any air or oxygen gas prior to being introduced into the pyrolysis reactor and system. To facilitate this, in the embodiment shown, an oxygen-free gas 16 such as nitrogen ($N_2$) is introduced into the feed hopper 14 to purge air from the feedstock 12. As will be described in more detail later on, non-condensable pyrolysis gases 18, which are free of oxygen gas, may also be used as the purge gas for purging the feedstock 12, as is shown.

Figure 2:
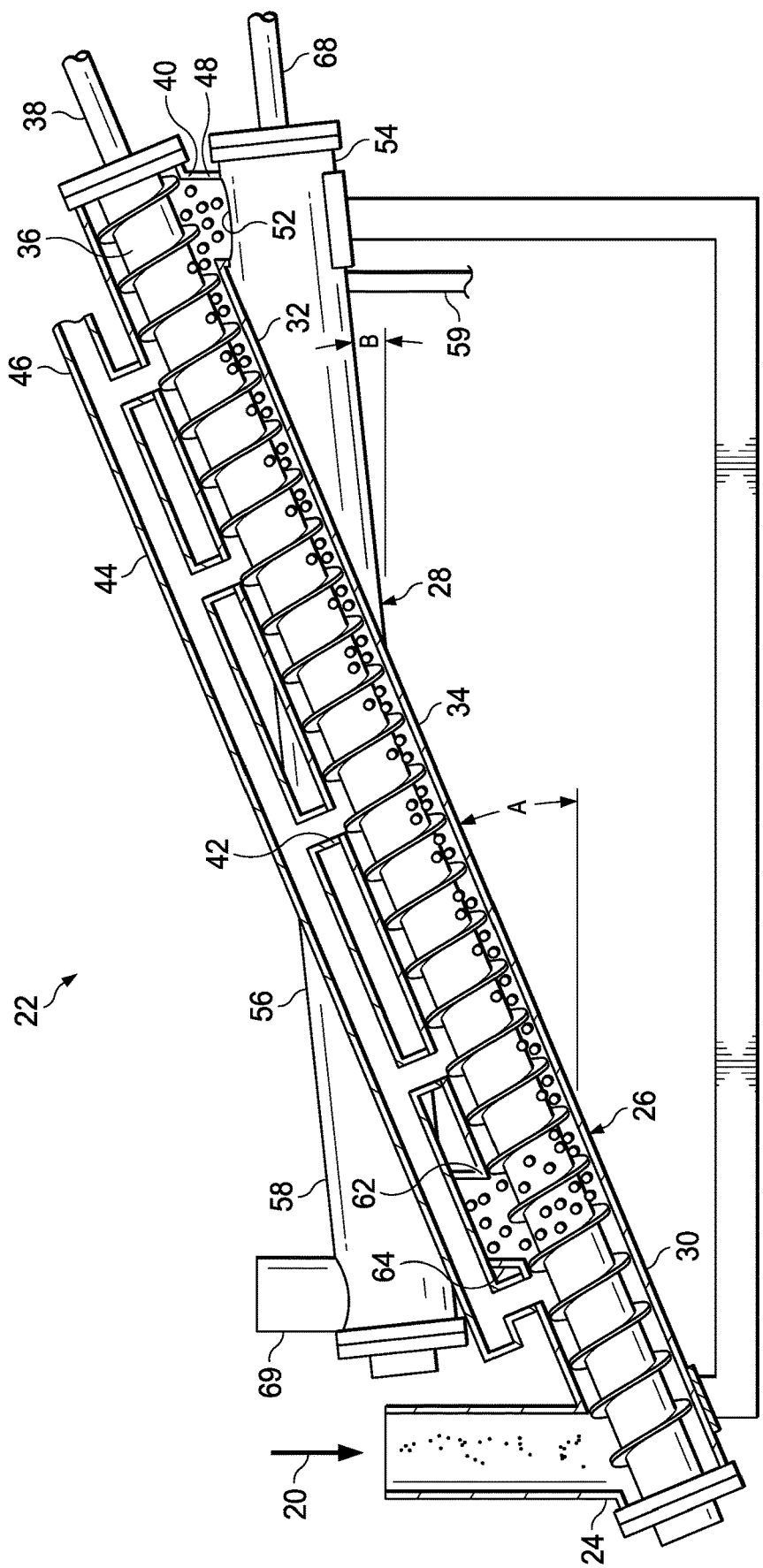
FIG. 2 is a front elevational view of a pyrolysis reactor, shown with a pyrolysis conduit segment of the reactor in cross section.

The purged feedstock from feed hopper 14 is fed as feed stream 20 to a pyrolysis reactor 22. Referring to FIG. 2, a more detailed view of a pyrolysis reactor 22 is shown. As can be seen, the feedstock is fed through feed chute to feed inlet 24 of the reactor 22. A feed conveyor, such as an auger or screw conveyor (not shown), or other feed conveyance system may be used to feed the pyrolysis feedstock from the feed hopper 14 to the pyrolysis reactor 22. This may be used to control the rate of feed of the feedstock to the pyrolysis reactor 22.

The pyrolysis reactor 22 is configured from two reactor segments 26, 28 that are in communication with one another to allow solids to pass between the reactor segments 26, 28. The reactor segments 26, 28 are adjacent to one another and are joined together and in communication with one another at opposite ends through risers or conduits to allow for the passage of solids, as is discussed in more detail later on, so that the reactor 22 is generally configured as a loop.

Figure 3:
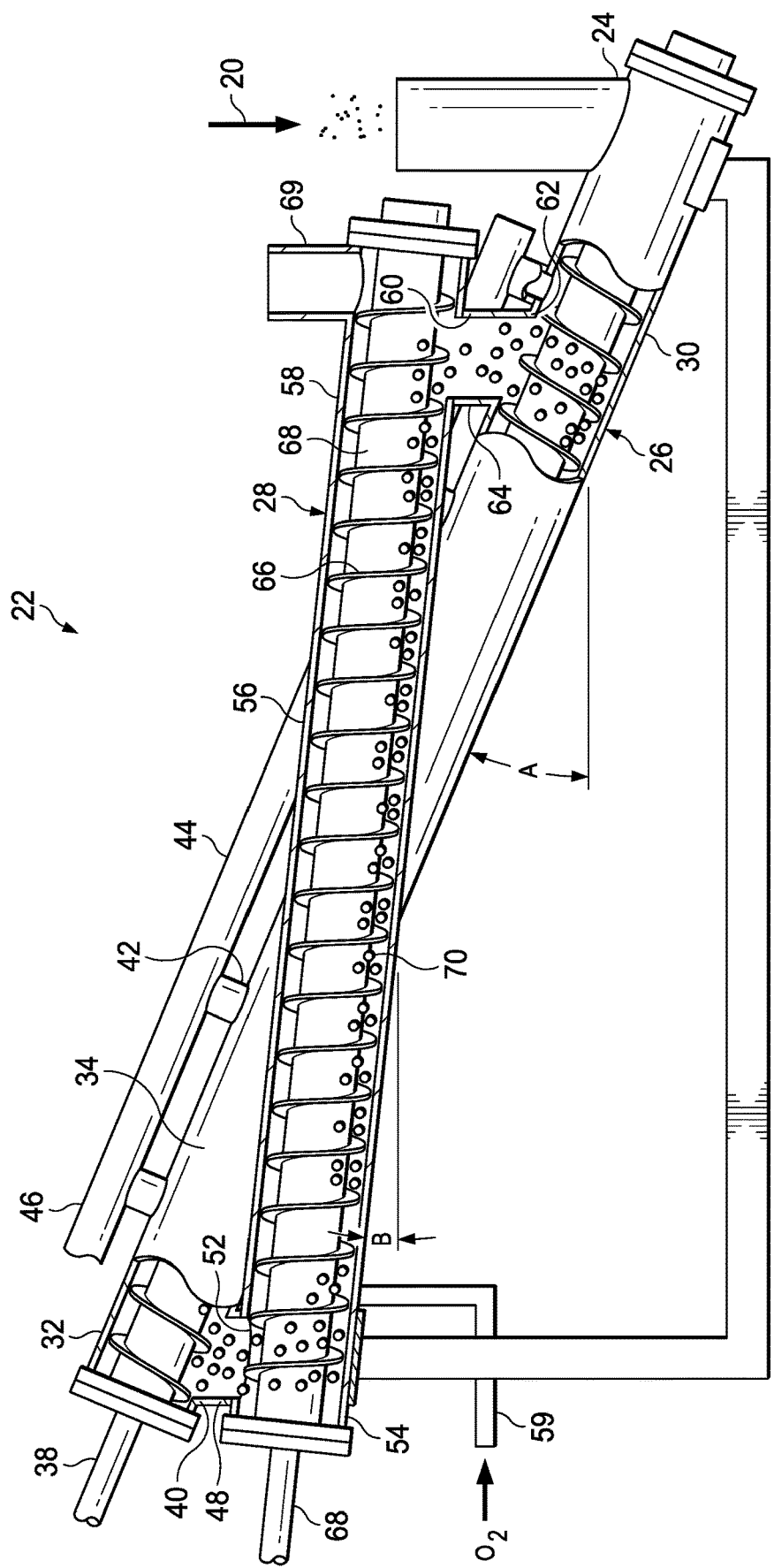
FIG. 3 is a rear elevational view of the pyrolysis reactor of FIG. 2, shown with a solids return conduit segment of the reactor in cross section.

FIG. 2 shows the reactor segment 26 of reactor 22 in longitudinal cross section, while FIG. 3 shows the opposite side of the reactor 22 with the reactor segment 28 in longitudinal cross section. As can be seen in FIG. 2, the reactor segment 26 has an inlet end 30 and a discharge or outlet end 32. The reactor segment 26 is non-horizontal and sloped upward from the inlet end 30 to the discharge end 32. The reactor segment 26 is configured as an elongated cylindrical conduit or vessel body 34 that is oriented at an angle or has a longitudinal axis that is sloped upward at an angle A relative to a horizontal line or plane, as shown in FIG. 2.

While in many embodiments the reactor segments 26, 28 may be cylindrical and/or linear in configuration, as shown and described herein, in other embodiments the reactor segments may have non-linear and/or non-cylindrical configurations. Such non-linear and/or non-cylindrical configurations of the reactor segments may still provide upward and downward flow paths between the respective inlets and outlets or discharges of the reactor vessels. Thus, while the reactor 22 is described as having linear and cylindrical reactor segments 26, 28, the reactor segments may have other configurations as well that provide similar upward and downward flow of the contents of the reactor segments, as is described herein. The length of the reactor segments 26, 28 may be determined by the heat requirement for providing the desired heat input for the pyrolysis reaction. This will typically be determined by the length of the reactor segment 28 where the combustion reaction takes place to allow sufficient combustion and heating to take place. In many cases, the diameters or transverse dimensions of the reactor segments 26, 28 will be the same, however, in certain instances they may be different.

Disposed within the reactor segment 26 is a solids conveyor 36, such as an auger or screw-type conveyor 36. The solids conveyor 36 may be driven by a drive member or shaft 38, which may be coupled to a motor (not shown) for driving the conveyor 36. In the embodiment shown, the solids conveyor 36 extends from the feed inlet 24 at the inlet end 30 to a discharge outlet 40 at the discharge end 32.

One or more gas exhaust outlets 42 are provided on the pyrolysis conduit segment 26 for exhausting pyrolysis gases from the reactor segment 26. In the embodiment shown, several outlets 42 are provided along the length of the segment 26. The outlets 42 are in communication with an exhaust outlet manifold 44 that directs the pyrolysis gases to a pyrolysis gas line 46 (FIG. 1).

Figure 4:
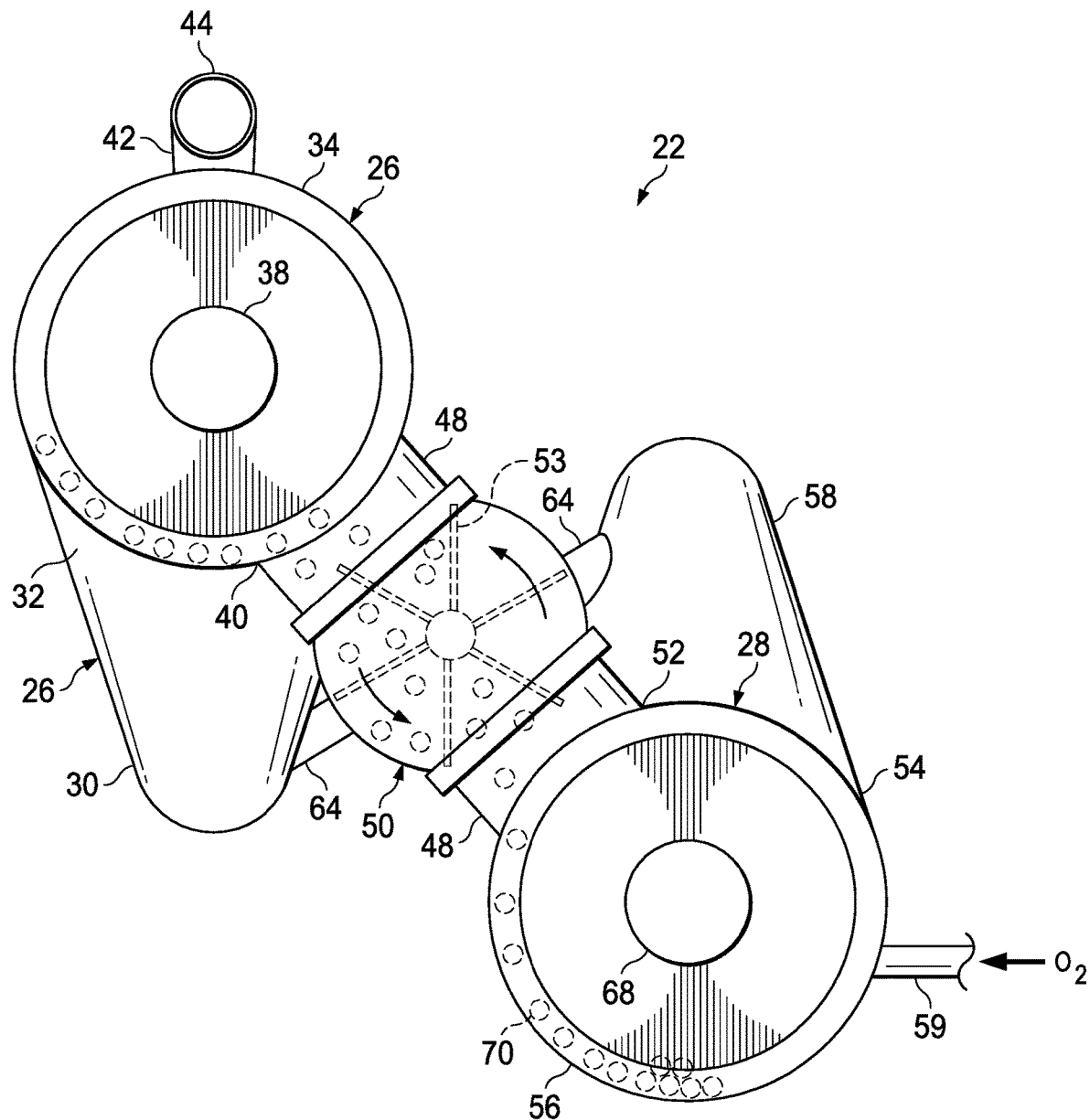
FIG. 4 a left side elevational view of the pyrolysis reactor of FIG. 2.

As shown in FIG. 4, a discharge riser or conduit 48 joins the outlet 40 and communicates through a valve 50, such as rotary valve or star valve, with a discharged solids inlet 52 of the reactor segment 28. The rotary or star valve 50 includes a rotor assembly with a plurality of rotor members 53 that are rotated about a drive shaft. The rotary or star valve 50 allows solids to pass between the reactor segments 26, 28, while providing a gas lock to prevent or minimize gas flow between the reactor segments 26, 28. As can be seen, the discharged solids inlet 52 is at a position below the solids discharge outlet 40 so that gravity, along with the actuation of the rotary valve 50, facilitates the passage of solids from the outlet 40 of reactor segment 26 through the star or rotary valve 50 to the inlet 52 at an inlet end 54 (FIG. 3) of reactor segment 28.

Referring to FIG. 3, the reactor segment 28 constitutes a solids return and combustion conduit for combusting fuel for supplying heat to the pyrolysis reactor segment 26, as is described later on. The segment 28 is configured as an elongated cylindrical conduit or vessel body 56 that is oriented at an angle or has a longitudinal axis that may be sloped downward from the inlet end 54 to an opposite outlet end 58. One or more gas inlets 59 is provided at or near the inlet end 54 to supply air or oxygen-containing gas, as well as any fuel gas (e.g., natural gas, non-condensable pyrolysis gases, etc.), used for combustion. The outlet end 58 is provided with a solids discharge outlet 60. The segment 28 may be sloped at an angle B relative to a horizontal line or plane, as shown in FIG. 3. As is shown, the slope or angle A of the reactor segment 26 is greater than the slope or angle B of the reactor segment 28. The difference in the slopes or angles A and B facilitates the alternating position of the respective inlets and outlets of the two reactor segments. As can be seen, the smaller slope or angle B of reactor segment 28 results in the solids discharge outlet 60 at the outlet end 58 being located at a position above a solids inlet 62 at the inlet end 30 of the reactor segment 26. A solids discharge riser or conduit 64 joins the outlet 60 of the reactor segment 28 communicates through a rotary or star valve (not shown) with the solids inlet 62 of the reactor segment 26. The rotary or star valve provided between the riser or conduit 64 between the outlet 60 and inlet 62 may be the same or similarly configured to the rotary or star valve 50, previously described, and allows solids to pass between the reactor segments 26, 28 through the outlet 60 and inlet 62, while providing a gas lock to prevent or minimize gas flow between the reactor segments 26, 28.

The difference in the angles A and B is a function of the length of each of the reactor segments 26, 28 and the position of the respective inlets and outlets connected by the risers or conduits 52, 62. By providing a difference in the angles A and B, the outlets of each reactor segment 26, 28 can be located at a position above the corresponding inlet of the other reactor segment. Thus, solid materials within each of the reactor segments can be fed at least partially through gravity due to the difference in the vertical position of the corresponding outlet and inlet. As an example, in certain embodiments, the difference in the angles A and B may range from 2° to 10°. The segment 28 will typically be sloped downward from the inlet end 54 to the outlet end 58 to facilitate transporting of solid materials within the segment 28 through gravity. In certain instances the segment 28 may be oriented horizontally or B may equal 0° with respect to a horizontal line or plane.

It should be noted that while the feed inlet 24 for introducing the pyrolysis feedstock is shown positioned downstream or below the solids inlet 62 of reactor segment 28, in other embodiments it may be positioned at or near the inlet end 30 at other positions of the reactor segment 26. Thus, in some embodiments, the feed inlet 24 may be positioned upstream or above the solids inlet 62 instead of behind it, as is shown in FIG. 2. The feed inlet 24 will typically be near or adjacent to the solids inlet 62 where heated solid materials are introduced into the reactor segment 26 through inlet 62.

To facilitate transport of solid materials through segment 28, a solids conveyor 66, which may be an auger or screw-type conveyor, is disposed within the solids return segment 28. The solids conveyor 66 may be driven by a drive member or shaft 68, which may be coupled to a motor (not shown) for driving the conveyor 66. This may be the same or a different motor than that used to drive the conveyor 36 of the reactor segment 26. In the embodiment shown, the solids conveyor 66 extends from the solids return inlet 52 at the inlet end 54 to the discharge outlet 60 at the discharge end 58. The use of the conveyor 66 allows the segment 28 to be oriented horizontally or near horizontal in certain embodiments, as discussed previously. A gas exhaust 69 is provided on the outlet end 58 of the conduit 56 of reactor segment 28 for exhausting combustion gases.

Provided within the reactor 22 are solid materials in the form of non-combustible particulate material 70. The particulate material 70 is a non-catalyst or non-catalytic material that does not serve as a catalyst necessary for the pyrolysis reaction. Instead, the particulate material 70 constitutes a heating material that supplies heat to the reactor segment 26 for pyrolysis. Additionally, the particulate material 70 acts as a comminuting or grinding material to facilitate the disintegration of char fragments formed in the pyrolysis reactor segment 26. The particulate material 70 may be formed from a variety of different materials but should be selected from those that can withstand the high temperatures and conditions encountered in the reactor 22 without substantial degrading or disintegrating and that has the necessary thermal properties for providing sufficient heat to the reactor segment 26 for the pyrolysis reaction.

Particularly useful are metal and metal alloy materials, such as iron, stainless steel, carbon steel, nickel, etc. having a melting point above the necessary temperatures necessary for pyrolysis. Particularly useful are ferrous materials and alloys. Such materials can withstand the high temperatures necessary for pyrolysis. They are typically non-brittle and will not tend to crack, pulverize or fragment during use. These metal materials also have a high thermal conductivity that facilitates heat transfer to provide heat in pyrolysis reactor segment 26 during the pyrolysis reaction.

Non-metal materials may also be used in certain instances. This can include ceramic and siliceous particulate materials, such as sand. Such materials may have a higher heat capacity than metals, but tend to have a lower thermal conductivity. Sand may also tend to degrade or create fines during use, requiring special handling techniques or accommodations to account for any fines produced. Composite materials may also be used. These may be metal/non-metal composites, such as ceramic/metal composite materials. Combinations of different particulate materials, metal and non-metal, may also be used.

The particulate material 70 may have a small particle size to provide increased contact between the pyrolysis feed 20 and particulate material 70. Particle sizes for the particulate material may range from 0.30 inch or less, more particularly from 0.30, 0.25, 0.20, 0.15, 0.10, 0.05 inch or less. In certain embodiments, the particle size for the particulate material 70 may range from 0.05 or 0.1 inch to 0.15 inches. The particle sizes may be uniform or a combination of different particle sizes may be used in the reactor 22. The particulate material may also be spherical or substantially spherical in configuration. Such spherical configurations may include smooth spheres, but may also include those particles that have an overall spherical shape, but may have non-uniform surface structure, such as surface undulations, recesses, projections, etc., which may provide a more efficient grinding capability, but that provide an overall spherical shape that allows the particulate material to roll, move or pass more readily through the reactor segments 26, 28. Particularly useful for the particulate material is smooth, spherical stainless steel shot having diameters of from 0.05 inch to 0.15 inch. In other embodiments, the particulate material 70 may be non-spherical in shape.

The amount of particulate material 70 used within the reactor 22 may vary. In certain embodiments, the particulate material 70 may be used in an amount to fill from 5%, 10%, 15%, 20%, 25%, 30%, 35%, or 40% to 45%, 50%, 55%, 60%, 65%, or 70% of the total volume of the reactor segment conduits 26, 28. During operation, the particulate material 70 will generally be transported and evenly dispersed throughout both reactor segments 26, 28 so that the particulate material 70 is not concentrated in any particular area of the reactor 22. The amount of particulate material 70 should be sufficient to provide the necessary heat for the pyrolysis reaction within the reactor segment 26, as discussed later on.

Where the solids conveyors 36, 66 of the reactor segments 26, 28, respectively, are augers or screw-type conveyors, the clearance between the walls of the reactor segments 26, 28 and the auger or screw conveyor may be slightly greater than the particle size or diameter of the particulate material 70 used. This allows the particulate material 70 to pass through such clearance so that it does not become lodged or pinched between the conveyor and the walls of the reactor segments 26, 28, which could result in clogging or jamming of the conveyors 36, 66. Alternatively, the clearance may be sufficiently small in relation to the particle size or diameter of the particulate material 70 so that the particulate material is prevented from becoming pinched or lodged between the conveyor and walls of the reactor segments.

In operation, the solids conveyors 36 and 66 of the reactor segments 26, 28, respectively, are operated to carry and circulate the particulate material 70 through the reactor segments 26, 28. The conveyors 36, 66 may each be operated by the same motor or different motors (not shown). For purposes of discussion, the particulate material 70 used in the following discussion is spherical stainless steel shot, as this has been found to be particularly useful in practice. It should be understood that other particulate materials could also be used instead.

As can be appreciated during the operation of the conveyors 36, 66, the steel shot 70 is conveyed through each of the segments 26, 28 so that they are generally evenly distributed throughout the reactor segments 26, 28. The particulate material 70 is circulated at a rate that is proportional to the feed rate and the minimum desired temperature selected for the particulate material 70. The amount and circulation rate of the particulate material is also a function of the heat capacity and thermal conductivity of the material 70. The higher the reaction temperature, the more particulate material may be used to provide the higher temperatures. For steel or iron-based particulate material 70, for instance, this may range from 10 lb to 100 lb of shot per pound of feed. By way of example, if the pyrolysis reaction takes place at a temperature of from 900° F. to 1200° F., the amount of steel shot may be between 40-60 lbs per pound of feed. Where the pyrolysis reaction takes place at a temperature of from 750° F. to 1000° F., the amount of shot may range from 10 to 40 lbs per pound of feed.

Referring to FIG. 2, as the steel shot 70 is conveyed upward from inlet end 30 along the length of the segment 26 to the discharge end 32, the shot material 70 within segment 26 is eventually discharged through outlet 40, downward through riser 48 and rotary valve 50 and into inlet 52 of the reactor segment 28. As shown in FIG. 4, because the outlet 40 of reactor segment 26 is positioned above or at least partially above the inlet 52 of reactor segment 28, the steel shot 70 is assisted through gravity as it is discharged from outlet 40 and rotary valve 50 through the solids inlet 52 of the reactor segment 28. Actuation of the rotary valve 50 may also assist transferring the steel shot 70 into solids inlet 52.

Referring to FIG. 3, the steel shot 70 introduced into the inlet 52 or reactor segment 28 is conveyed by the conveyor 66, as well as by gravity, along the length of the reactor segment 28 to solids return outlet end 58 where the steel shot 70 is discharged through solids return outlet 60 downward through riser 64 and rotary valve (not shown) to the solids inlet 62 of reactor segment 26. Because of the difference in configurations or slopes of the two reactor segments 26, 28, with reactor segment 26 being sloped at a greater angle A than the angle of slope B for reactor segment 28, the solids return outlet 60 is at a position above or at least partially above the solids inlet 62 of reactor segment 26. Thus the steel shot 70 is assisted through gravity as it is discharged from outlet 60 and falls through the solids inlet 62 of the reactor segment 28. Actuation of the rotary valve (not shown) at the outlet end 58 of reactor segment 28 will also assist transferring the steel shot 70 into solids inlet 52 of reactor segment 26.

The reactor segment 28 also forms a combustion chamber where a fuel source is introduced into the reactor segment 28 and ignited to provide the required heat of reaction for the pyrolysis reaction. The fuel source may initially be natural gas or non-condensable pyrolysis gases from a prior pyrolysis reaction. Such fuel gas, along with air or other oxygen-containing gas, necessary for combustion may be metered and introduced through gas inlets, such as the inlet 59. The combustion in reactor segment 28 creates the heat necessary for the pyrolysis reaction by heating the steel shot or particulate matter 70. In the reactor segment 28, the combustion and final shot temperature prior to its discharge may be from 750° F. to 1500° F. to provide the necessary heat for heating of the steel shot or particulate 70 to a sufficient temperature to provide the desired pyrolysis temperatures.

The heated shot 70 is introduced into the solids inlet 62. The rotary or star valve (not shown), similar to the star valve 50, between the solids discharge outlet 60 and the solids inlet 62 allows the heated shot 70 to enter the reactor segment 26 from reactor segment 28, but prevents or minimizes any residual oxygen or combustion gases from reactor segment 28 being introduced into the reactor segment 26. As this is occurring, the purged feedstock 20, such as wood sawdust, from feed hopper 14 (FIG. 1) is fed into the inlet 24 of reactor segment 26 of reactor 22. The actuation of the solids conveyor 36 facilitates mixing of the heated steel shot 70 and particulate feedstock so that the pyrolysis feedstock is immediately pyrolyzed in a fast pyrolysis reaction. In such reactions, the pyrolysis reaction temperatures may range from 750° F. to 1200° F. This typically takes place within the first ¼ or less of the reactor segment 26 where the feed is combined with the steel shot 70 and typically takes place within less than 1 or 2 seconds, with all the feed being pyrolyzed.

While the pyrolysis reaction may take place without any catalyst, in some embodiments a pyrolysis catalyst may be used. Such pyrolysis catalyst may be circulated through the reactor segments as a solid particulate material, as with the steel shot 70. The pyrolysis catalyst may be used in combination with non-catalyst particulate material 70 or in lieu of the non-catalyst particulate material 70.

The hot pyrolysis gases formed from the pyrolysis reaction are immediately discharged through gas exhaust outlets 42 and into manifold 44 to pyrolysis gas line 46.

One of the byproducts of the pyrolysis reaction is char, which includes biochar when pyrolyzing biomass materials. The char is a solid material that remains in the reactor segment 26 and is passed upward through the reactor segment 26 along with the shot or particulate material 70 by means of the conveyor 36. The intermixing of the char with the steel shot 70 helps to degrade the char so that it is ground, crushed, or comminuted into very fine particles. In certain embodiments, the char fines are passed with the shot 70 out of outlet 40 of reactor segment 26 and through riser 48 and rotary valve 50 and into the solids inlet 52 of reactor segment 28. Once the pyrolysis reaction has started, the char fines from the pyrolysis reaction are introduced into the reactor segment 28 from reactor segment 26 and may form the sole fuel used for combustion in the reactor segment 28 so that no additional fuel, such as natural gas, is needed. The shot or particulate material 70 that is reheated by the combustion of the char in the reactor segment 28 is conveyed by the auger or conveyor 66 to outlet 60 and into solids inlet 62 of the reactor segment 62, as previously described.

In other embodiments, all or a portion of the char produced in the reactor segment 26 may be passed through a screen or other separator device (not shown) to separate the shot or particulate material 70 from the char fines so that the shot or particulate material 70 is retained and circulated within the reactor 22, as has been described. Where char is removed from the reactor 22, a separate combustion fuel may need to be added to the reaction. This may include a fuel such as natural gas, or it may include non-condensable pyrolysis gases from the pyrolysis reaction that are circulated back to the reactor segment 28, as is described later on. The separated char may then be used as a fuel elsewhere or for other purposes, such as a source of fertilizer material. Indeed, in certain cases, char may be a beneficial product of the pyrolysis reaction such that the pyrolysis reaction is optimized to produce higher quantities of char with less pyrolysis oils being produced. In such instances, lower pyrolysis temperatures may be used so that the reaction tends to produce higher amounts of char. Such reaction temperatures may range from 750° F. to 900° F. in certain applications.

Referring to FIG. 1, the hot pyrolysis gases 46 from reactor 22 are feed into a gas/solids separator 72, such as a cyclone separator. The separator 72 separates any solids, such as ash and/or char fines that are carried over with the pyrolysis gases. The ash and/or char are removed as solids stream 74. In certain embodiments, all or a portion of the char from separator 72 may be returned to the reactor segment 28 to be used as fuel. Separated pyrolysis gases are discharged from separator 72 as separated gas stream 76. In certain embodiments, a secondary filter, such as a bag filter (not shown), may be used to further filter out any entrained solids remaining in the gas stream 76.

The separated pyrolysis gases 76 from separator 72, and any secondary filter, are then fed into a first condenser unit 78. In certain embodiments, the pyrolysis gases are removed from the reactor 22 and condensed within 5, 4, 3, or 2 seconds or less, more particularly from 2 seconds or less, to increase the amount of pyrolysis oils recovered. In particular embodiments, the condenser unit 78 may be a direct contact condenser, such as a spray condenser, where liquid coolant is combined with and comes into direct contact with the pyrolysis gases. Such direct contact condensers achieve some of the fastest condensing times. The liquid coolant is typically a hydrocarbon, such as kerosene or a similar petroleum distillate. Previously condensed pyrolysis oils may also be used as the liquid coolant. Water or other aqueous liquids may also be used as the liquid coolant in some embodiments. The liquid coolant facilitates the condensing of condensable pyrolysis gases introduced into the unit 78 to form pyrolysis oils. The liquid coolant introduced will typically be at a coolant temperature of from 85° F. to 200° F., more particularly from 100° F. to 150° F. The liquid coolant may be one that is immiscible with the condensed pyrolysis oils to facilitate separation of the coolant from the pyrolysis oils. Use of non-polar liquid hydrocarbons as the cooling liquid is particularly useful. Because the pyrolysis oils, particularly pyrolysis oils from biomass, are often polar compounds due to their large oxygen or heteroatom content, they are typically immiscible with non-polar hydrocarbon liquids, such as kerosene or other petroleum distillates. This allows the non-miscible liquid coolant to be readily separated from the condensed pyrolysis oils.

As is shown, the pyrolysis oils are collected in the bottom of the condensing unit 78 and removed as stream 80, while the lighter immiscible liquid coolant is removed as upper stream 82. In certain cases, the combined liquids of coolant and pyrolysis oils may be removed from the condenser unit and introduced into a separate separating unit (not shown) to facilitate separation of pyrolysis oils and liquid coolant. The separated coolant 82 is recirculated and may be pumped and pressurized via pumping unit 84 where it is first directed to a heat exchanger 86. The heat exchanger 86 removes heat and cools the liquid coolant to the desired coolant temperature prior to being reintroduced into the condenser unit via spray nozzles 88.

In some cases, the condenser unit 78 may be sufficient to condense most or a large quantity of pyrolysis gases from the reactor 22 to form the pyrolysis oils. In many cases, however, there may still be non-condensed pyrolysis gases that can be further condensed to form additional pyrolysis oils. Moreover, a certain amount of pyrolysis oils may become entrained as small droplets or mist in the gases removed from the first condenser unit 78. In the embodiment shown in FIG. 1, the non-condensed pyrolysis gases from condensing unit 78, along with any entrained pyrolysis droplets or mist, are directed to a second condenser unit 92. In the embodiment shown, the condensing unit 92 is formed from an eductor assembly 94 and mixing unit 96.

Figure 5:
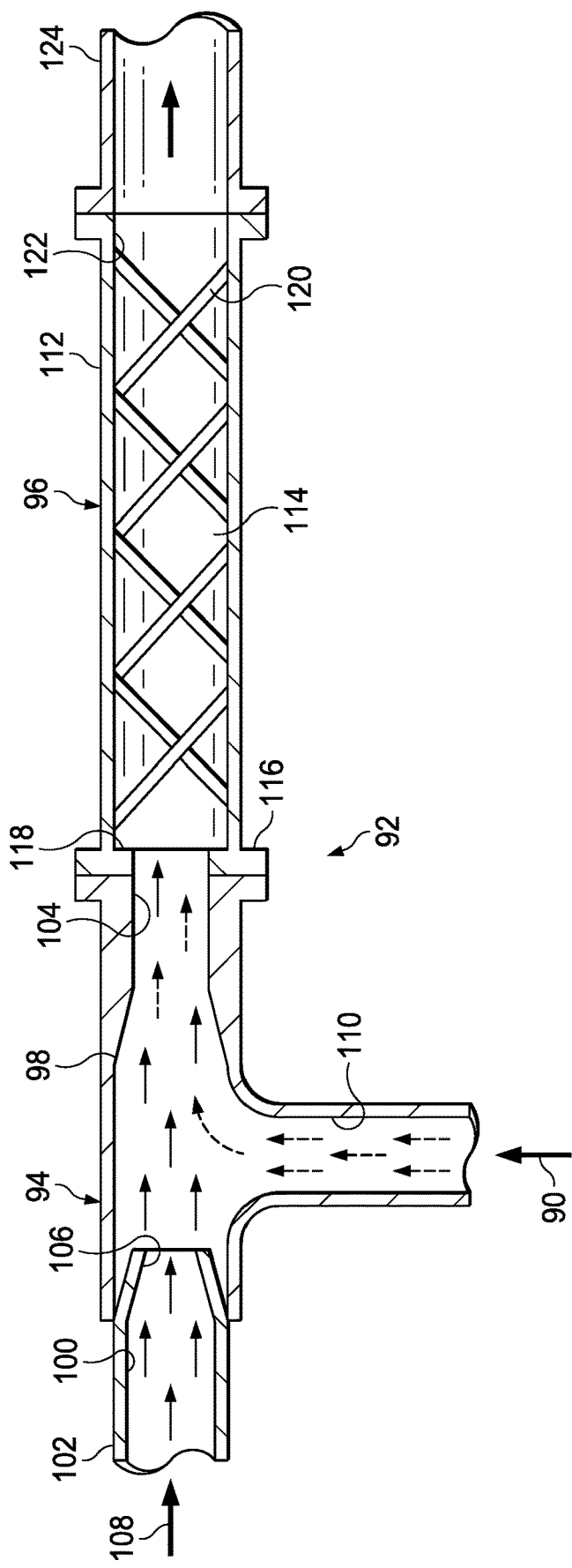
FIG. 5 is cross-sectional, elevational view of an eductor condensing unit configured in accordance with particular embodiments of the invention.

FIG. 5 shows a more detailed view of the condenser unit 92 employing the eductor assembly 94 and mixing unit 96. The eductor assembly 94 has an eductor body 98 that defines a flow path 100 that extends longitudinally through the eductor body 98 from an inlet 102 at one end to an opposite outlet or discharge 104. The flow path 100 includes a venturi restriction 106 between the inlet 102 and outlet 104. As is shown, pressurized liquid coolant 108 is introduced through inlet 102 and flows through flow path 100 through the venturi 106 to outlet 104.

A second flow path 110 is provided in the eductor body 98 that intersects the first flow path 100. The non-condensed pyrolysis gases from stream 90, as described previously, are drawn into the second flow path 110 and combined with the liquid coolant 108 in flow path 100. Because the pyrolysis gases 90 from the first condenser unit 78 may not be sufficiently pressurized to pass through a second condenser unit, the eductor assembly 94 serves to further pressurize the pyrolysis gases 90. The pressurized liquid coolant 108 serves as a drive fluid for the eductor assembly 94. As the coolant 108 passes through the venturi 106 at high velocity it creates a pressure drop so that the non-condensed pyrolysis gases from stream 90 are drawn through second flow path 110 into the flow path 100 of the eductor assembly 94. The gases from flow path 110 thus become combined and entrained with the liquid coolant from coolant stream 108 in flow path 100 where they are discharged through outlet 104 of the eductor 94 to the mixing unit 96.

The mixing unit 96 may constitute a static mixer that provides sufficient mixing of the combined liquid coolant and pyrolysis gases so that any non-condensed pyrolysis oils are condensed. This allows the pyrolysis gas vapor to come into intimate contact with the coolant liquid so that substantially all the condensable pyrolysis oil is condensed and can be recovered. The mixing unit 96 includes a mixing vessel or housing 112, which may be formed as a length of cylindrical conduit. The housing 112 defines an interior mixing chamber 114. The housing 112 is coupled to the outlet 104 of the eductor body 98 at an inlet end 116, with the mixing chamber 110 being in fluid communication with the eductor outlet 104 so that an inlet 18 of the mixing unit 96 receives the discharged fluids from the eductor outlet 104. The mixing chamber 114 may be provided with a series or plurality of mixing elements or baffles 120 positioned along its length. Such mixing elements 120 may be in a variety of configurations (e.g., helical). For static mixers the mixing elements or baffles 120 may be stationarily mounted within the housing 112.

In other embodiments where sufficient pressure remains for the non-condensed pyrolysis gases of stream 90 from condensing unit 78, the pyrolysis gases may be introduced into a second condensing unit wherein a coolant liquid is combined with the non-condensed pyrolysis gases in a mixing unit without the use of the eductor assembly 94.

The mixed fluids of condensing unit 92 are discharged from the mixing unit 96 through mixing unit outlet 122 to line 124 (FIG. 1). The discharged fluids, which include condensed pyrolysis oils, liquid coolant (e.g., kerosene), and non-condensable gases, from line 124 are introduced into separating unit 126. As can be seen in FIG. 1, condensed pyrolysis oils are removed from the separator 126 as stream 128, while liquid coolant is removed as stream 130. Non-condensable gases, such as $H_2$, $CO_2$, CO, and $CH_4$, are removed as stream 132.

The removed liquid coolant 130 is pressurized through pumping unit 134 and cooled by means of heat exchanger 136 before it is reintroduced into the second condensing unit 92 as coolant stream 108. The liquid coolant will typically be cooled to a coolant temperature of from 85° F. to 200° F., more particularly from 100° F. to 150° F. prior to its introduction into the condensing unit 92.

In certain embodiments, all or a portion the non-condensable gases from stream 132, or stream 90 in cases where a second condensing unit is not employed, can be recycled back as a fuel feed 138 to the reactor 22. This may be introduced into the reactor segment 28, as previously described. Because the non-condensable gases typically contain no or very little free oxygen, all or a portion of the non-condensable gases from stream 132 or stream 90 may also be used as a purge gas 18, as described previously, for purging the pyrolysis feedstock 12. This is beneficial in that the system 10 produces its own purge gas so that a separate purge gas, such as nitrogen gas, does not have to be used. All or a portion of the non-condensable gases can also be removed from the system 10 as stream 140 to be used as a fuel or feed for other processes elsewhere.

The pyrolysis oils from streams 80 and 128 are collected for storage, use or further processing. In certain cases, the pyrolysis oils may be further treated or upgraded. Because pyrolysis oils from biomass often have a high olefin and/or high contaminant content in the form of heteroatoms, such as oxygen, nitrogen, sulfur, etc., their use can be limited. In one particular application, the pyrolysis oils from biomass materials may be further processed through hydroprocessing or hydrotreating methods to form more usable or upgraded products.

In certain cases, the pyrolysis oils may be used without further upgrading. One such use for such pyrolysis oils derived from biomass, particularly wood biomass, is liquid smoke, which is used for food flavoring.

Examples of such methods are those described in U.S. Pat. No. 9,096,804, issued on Aug. 4, 2015, and in pending U.S. patent application Ser. No. 14/816,404, filed Aug. 3, 2015, each of which is incorporated herein in its entirety for all purposes. As described therein, non-petroleum feedstocks, such as those formed from the pyrolysis of biomass, can have from 10% to 50% or more by weight of olefinic and/or heteroatom contaminants, particularly oxygen.

As described U.S. Pat. No. 9,096,804 and in U.S. patent application Ser. No. 14/816,404, biomass pyrolysis oils are combined with a diluent and hydrogen in a first reaction zone containing a hydroprocessing catalyst. The amount of liquid diluent may be combined with the feed for different purposes. These may include 1) dissolving a preselected amount of hydrogen in the combined biomass oil/diluent feed; 2) maintaining the temperature within the reactor below a preselected temperature; and/or 3) adjusting the capacity of the liquid phase to dissolve or carry water and hydrogen. The biomass pyrolysis oil and hydrogen are allowed to react in a liquid phase within the first reaction zone to produce reaction products, at least one of the reaction products being water. The reaction products are removed from the first reaction zone and the formed water is separated from the removed reaction products as an aqueous phase to provide a separated reaction product that is free from the separated water. At least a portion of the separated reaction product is introduced as a feed along with hydrogen into a second reaction zone containing a hydroprocessing catalyst. This is then allowed to react in a liquid phase within the second reaction zone to produce a second reaction product. The diluent may be formed from the separated reaction products. The products produced from such hydroprocessing may include diesel, naphtha, light end products (e.g., $H_2S$, $NH_3$, and light hydrocarbons), and heavy end products, as well as water.

Figure 6:
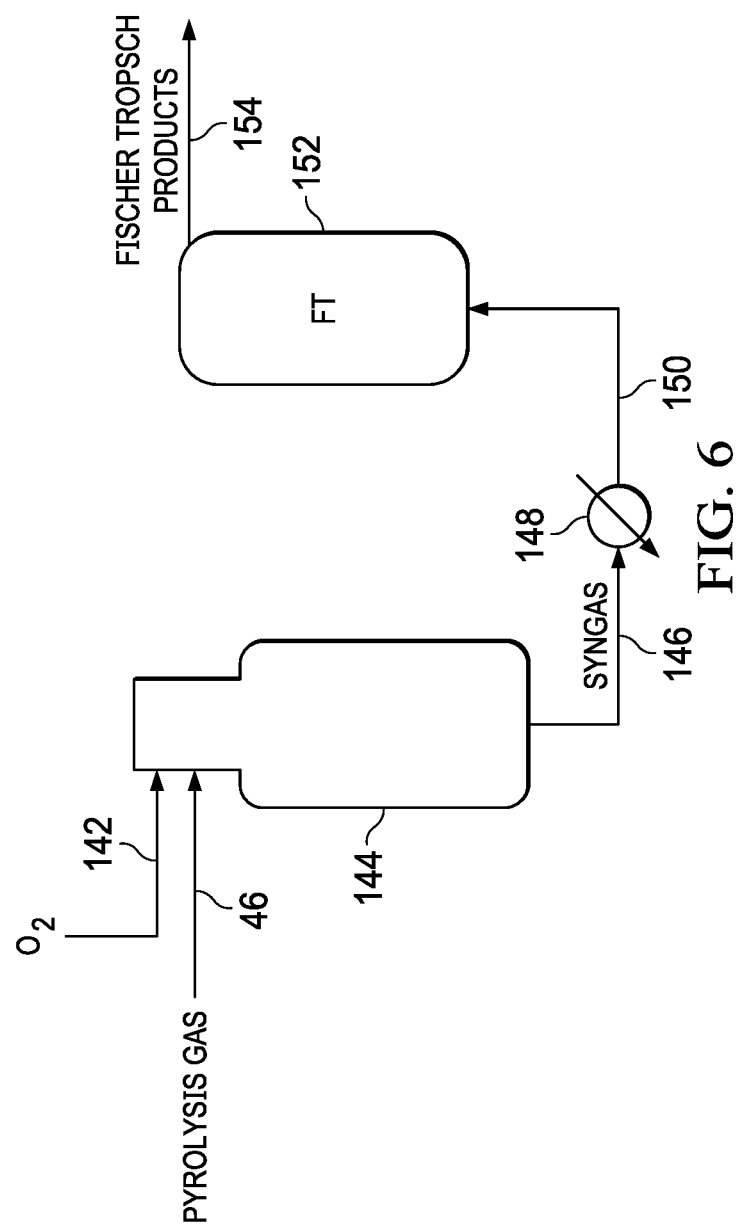
FIG. 6 is schematic flow diagram of a syngas/Fischer-Tropsch reactor system for converting pyrolysis gas to syngas and liquid hydrocarbons in accordance with particular embodiments of the invention.

Referring to FIG. 6, in an alternate embodiment, instead of producing pyrolysis oils after the pyrolysis reaction, all or a portion of the exhausted pyrolysis gases 46 from pyrolysis reactor 22 (FIG. 1), without any condensing, are introduced along with an oxygen-containing gas ($O_2$) (e.g., air) stream 142 into a syngas reactor 144 under conditions suitable to produce synthesis gas or "syngas" (i.e., $CO+H_2$). The syngas 146 is removed from reactor 144 and may be cooled in heat exchanger 148. The cooled syngas 150 is then introduced into a Fischer-Tropsch reactor containing a Fischer-Tropsch catalyst where the syngas contacts the Fischer-Tropsch catalyst under conditions suitable to produce a liquid hydrocarbon product 154.

Figure 7:
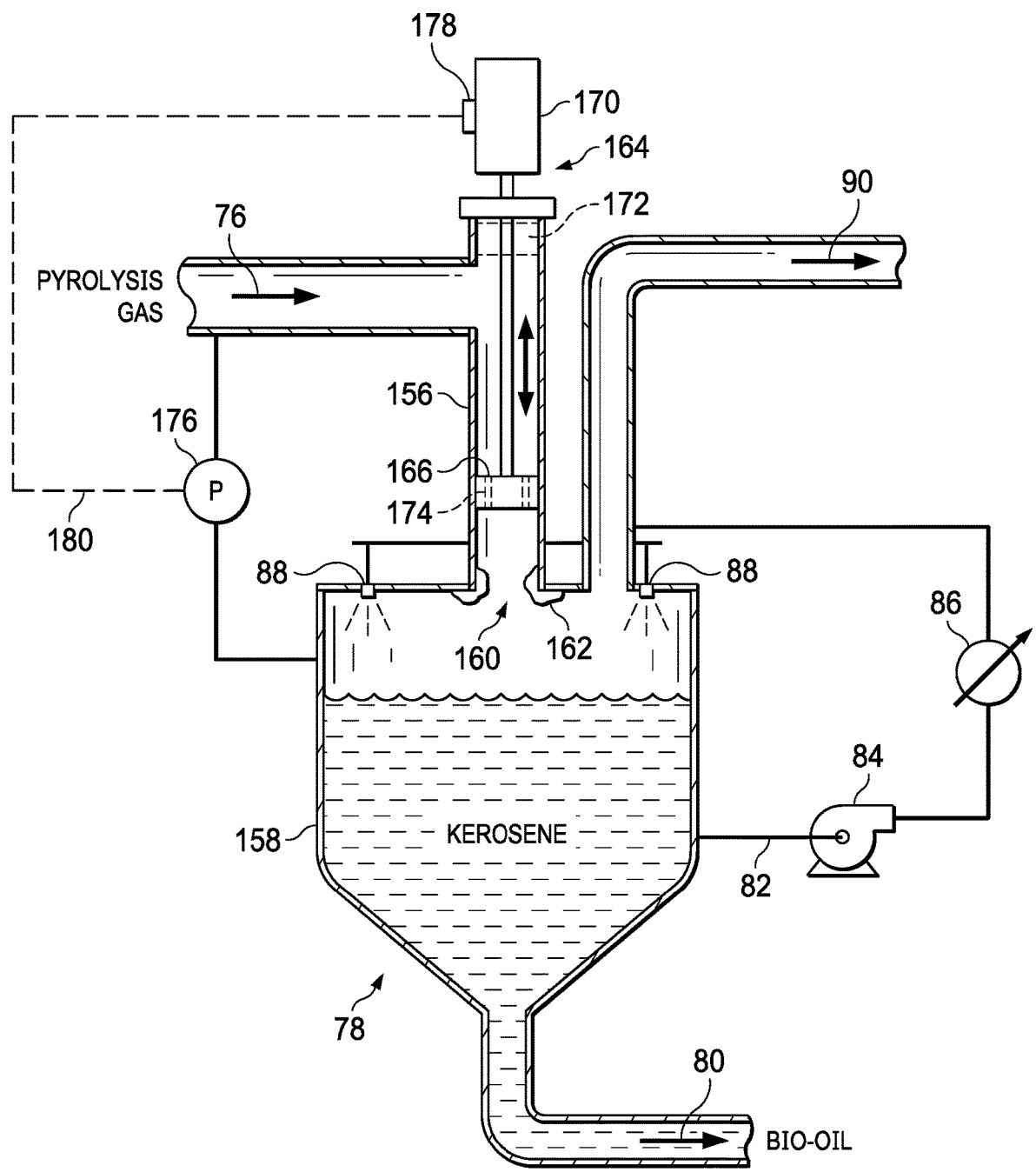
FIG. 7 is a cross-sectional, elevational view of a condensing unit employing a clearing assembly for clearing an inlet of the condensing unit constructed in accordance with particular embodiments of the invention.

FIG. 7 shows a more detailed view of the condenser unit 78. As shown, separated pyrolysis gases 76 from separator 72 (FIG. 1) are fed into condenser unit 78 through inlet conduit 156 and introduced into the interior of the condenser unit vessel 158 of the condenser unit 78 where they come into direct contact with liquid coolant introduced through spray nozzles 88. Where the liquid coolant comes into contact with metal surfaces of the condensing unit 78, pyrolysis gases may tend to condense on these surfaces. For example, sprayed cold liquid coolant (e.g., kerosene) at 100° F. may be introduced in the interior of the condenser unit vessel 158. The pyrolysis gases are hot (e.g., 1000° F.). The inlet conduit 156 of the condenser unit 78 is cooled or "chilled" by conduction due to the spraying and contact of the liquid coolant with the surfaces of the condensing unit, which are cooled to a low temperature. These surfaces may be cooled to a temperature sufficient (e.g., 200° F.) for pyrolysis oils to condense on the surfaces of the condensing unit itself. As a result, there can be a buildup of heavy pyrolysis oils on these surfaces. In particular, condensed pyrolysis oil may build up at the inlet 160 of the condensing unit 78 where the pyrolysis gases 76 are introduced into the vessel 158. This, along with any solids not removed in separator 72 (FIG. 1), may cause the inlet 160 to become periodically clogged or plugged. In the embodiment shown in FIG. 7, this pyrolysis oil or solids buildup, indicated at 162, may be removed by means of a clearing assembly 164.

The clearing assembly 164 may be in the form of a plunger or piston 166 carried on shaft or rod 168 and extends into the inlet conduit 156. The plunger or piston 166 is configured so that it is closely received within the conduit 156 so that the outer edges of the plunger or piston 166 are in contact with or in a near touching relationship with the interior walls of the conduit 156. The piston 166 and shaft 168 are actuated by an actuator 170 of the assembly 164. Initially, the piston 166 may be in a retracted position, indicated at 172, where it may be out of the way and does not block the inlet conduit 156. When the actuator 170 is actuated, the plunger or piston 166 is moved or "plunged' to an extended position where it passes through the inlet conduit 156 to the inlet 160 so that it clears or pushes away any condensed pyrolysis oils or accumulated materials 162 that may tend to block or plug the inlet 160 or inlet conduit 156.

The piston or plunger 166 may be a solid body that completely blocks further flow through the inlet conduit 156. In such instances, the piston or plunger 166 should be located in a fully retracted position so that it does not block the introduction of pyrolysis gases. In other instances, the piston or plunger 166 is provided with one or more interior passages or openings 174 that extend through the thickness of the piston or plunger and that are spaced radially inward from the outer circumference of the piston or plunger body. This configuration allows pyrolysis gas to continue to flow through the plunger or piston 166 even while the plunger or piston 166 is in a non-retracted position or is located within the condenser inlet conduit 156 both in a retracted and non-retracted position. The edges of the plunger or piston 166 still engage the walls of the conduit 156 to clear or remove buildup from the walls of the inlet conduit 156 and inlet 160 as gas is allowed to flow through the plunger or piston body.

In another embodiment, the clearing assembly 164 may be that that provides a jet or jets of a liquid or gas that is jetted into inlet conduit at a sufficient rate and pressure to remove any pyrolysis oil or material buildup. Such jetted fluid may be at an elevated temperature to prevent cooling or minimize condensation within the inlet conduit 156.

The clearing assembly 164 may be operated manually or may be automated so that it is periodically actuated at intervals to clear the inlet conduit 156 and inlet 160. In certain embodiments, a pressure sensor 176 may be provided to monitor a pressure difference or drop between the introduced pyrolysis gas 76 and the internal pressure of the condensing unit 78. A large pressure drop may be indicative of plugging or clogging of the inlet 160. When the pressure difference reaches a preselected level, the clearing assembly 164 may be actuated.

In certain embodiments, a controller 178 may be provided with the clearing assembly 164 to facilitate actuation of the actuator 170. The controller 178 may be configured and programmed to receive a signal 180 from the pressure sensor 176 so that when a selected pressure drop or difference is monitored, the controller 178 will actuate the actuator 170 to actuate the plunger or piston 166 to clear the inlet conduit 156 and inlet 160.

The following examples better serve to illustrate the invention.

EXAMPLES

Example 1

A pyrolysis feedstock of yellow pine sawdust having a particle size of less than 3 mm was fed into a pyrolysis reactor configured similarly to the pyrolysis reactor 22, as has been described. The pyrolysis feedstock was fed at a rate of 11 lbs/hr. The reactor was kept at a reaction temperature of 1000° F. The pyrolysis gases produced from the reactor were passed to a cyclone filter to separate solids from the pyrolysis gases. The pyrolysis gases were condensed using kerosene at a temperature of 100° F. as the coolant. The pyrolysis reaction yielded 65 wt. % of pyrolysis oils, 18 wt. % char, and 17 wt. % undesirable materials.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A system for the pyrolysis of a pyrolysis feedstock comprising:
   a pyrolysis reactor comprising:
      a pyrolysis conduit segment having a solids inlet at an inlet end and a solids discharge outlet at an opposite discharge end, the pyrolysis conduit segment also having at least one gas outlet for exhausting gases from the pyrolysis conduit segment, the pyrolysis conduit segment being sloped upward from the inlet end to the discharge end;
      a solids return and combustion conduit segment that forms a combustion chamber having a discharged solids inlet at one end that is positioned below and in communication with the solids discharge outlet of the pyrolysis conduit segment for receiving solids discharged from the solids discharge outlet of the pyrolysis conduit segment and a solids return outlet at an opposite end, the solids return and combustion conduit segment being sloped downward from the discharged solids inlet end to the solids return outlet end, the solids return outlet being positioned above and in communication with the solids inlet of the pyrolysis conduit segment for delivering solids to the solids inlet, the solids return and combustion conduit segment having at least one gas inlet for introducing gases used for combustion within the solids return and combustion conduit segment; and
   a solids conveyor disposed within the pyrolysis conduit segment to facilitate conveying solid materials from the solids inlet upward through the pyrolysis conduit segment toward the solids discharge outlet.

2. The system of claim 1, wherein:
the solids conveyor is a screw-type conveyor.

3. The system of claim 1, further comprising:
a condenser unit in fluid communication with the at least one gas outlet of the pyrolysis conduit segment for condensing condensable pyrolysis gases.

4. The system of claim 3, wherein:
the condenser unit is at least one of a direct contact condenser and a static mixer having an eductor fluid delivery assembly.

5. The system of claim 1, further comprising:
an amount of non-combustible particulate matter that circulates through the pyrolysis conduit segment and solids return and combustion conduit segment and facilitates at least one of heating of the pyrolysis reactor segment and disintegration of char fragments formed in the pyrolysis reactor.

6. The system of claim 1, further comprising:
a solids conveyor disposed within the solids return and combustion conduit segment to facilitate conveying solid materials from the discharged solids inlet through the solids return conduit segment toward the solids return outlet.

7. The system of claim 1, further comprising:
an eductor condenser unit in fluid communication with the pyrolysis reactor, the condenser unit comprising:
   an eductor assembly having an eductor body that defines a first flow path with a venturi restriction disposed therein for receiving a pressurized coolant fluid and a second flow path for receiving pyrolysis gases from the pyrolysis reactor, the second flow path intersecting the first flow path so that the received pyrolysis gases are combined with the coolant fluid, the eductor body having a discharge to allow the combined coolant fluid and pyrolysis gases to be discharged together from the eductor; and
   a mixing chamber in fluid communication with the discharge of the eductor to facilitate mixing of the combined coolant fluid and pyrolysis gases wherein at least a portion of the pyrolysis gases are condensed within the mixing chamber.

8. The system of claim 7, further comprising:
a second condenser unit in fluid communication with the pyrolysis reactor for condensing pyrolysis gases from the pyrolysis reactor, and wherein non-condensed pyrolysis gases from the second condenser are discharged to and received by the second flow path of the eductor condenser unit.

9. The system of claim 8, wherein:
the second condenser unit further comprises a condenser inlet clearing assembly to facilitate clearing of pyrolysis oil and/or solids buildup from an inlet of the second condenser unit.

10. The system of claim 8, wherein:
the second condenser unit is a direct contact condenser.

11. The system of claim 7, wherein:
the pyrolysis feedstock is biomass.

12. The system of claim 1, further comprising:
a gas/solids separator in communication with the at least one gas outlet for separating solids from the exhausted gases of the pyrolysis conduit segment.

13. A method for the pyrolysis of a pyrolysis feedstock comprising:
introducing the pyrolysis feedstock into a pyrolysis reactor, the pyrolysis reactor comprising:
a pyrolysis conduit segment having a solids inlet at an inlet end and a solids discharge outlet at an opposite discharge end, the pyrolysis conduit segment also having at least one gas outlet for exhausting gases from the pyrolysis conduit segment, the pyrolysis conduit segment being sloped upward from the inlet end to the discharge end;
a solids return and combustion conduit segment that forms a combustion chamber having a discharged solids inlet at one end that is positioned below and in communication with the solids discharge outlet of the pyrolysis conduit segment for receiving solids discharged from the solids discharge outlet of the pyrolysis conduit segment and a solids return outlet at an opposite end, the solids return and combustion conduit segment being sloped downward from the discharged solids inlet end to the solids return outlet end, the solids return outlet being positioned above and in communication with the solids inlet of the pyrolysis conduit segment for delivering solids to the solids inlet, the solids return and combustion conduit segment having at least one gas inlet for introducing gases used for combustion within the solids return and combustion conduit segment; and
a solids conveyor disposed within the pyrolysis conduit segment to facilitate conveying solid materials from the solids inlet upward through the pyrolysis conduit segment toward the solids discharge outlet;
allowing at least a portion of the feedstock to be converted to pyrolysis gases in a pyrolysis reaction within the pyrolysis conduit segment;
exhausting the pyrolysis gases through the at least one gas outlet;
conveying solid materials within the pyrolysis conduit segment to the solids discharge outlet with the solids conveyer so that solid materials are introduced into the solids return and combustion conduit segment through the discharged solids inlet, the solid materials containing solid char material produced during the pyrolysis reaction; and
combusting the solid char material within the solids return and combustion conduit segment to provide heat for the pyrolysis reaction that is supplied to the pyrolysis conduit segment through the solids inlet from the solids return outlet.

14. The method of claim 13, wherein:
the solid materials include an amount of non-combustible particulate matter that circulates through the pyrolysis conduit segment and the solids return and combustion conduit segment and facilitates at least one of heating of the pyrolysis reactor segment and disintegration of char fragments formed in the pyrolysis reactor.

15. The method of claim 14, wherein:
the non-combustible particulate matter is metal shot and/or pellets.

16. The method of claim 13, further comprising:
introducing the exhausted pyrolysis gases from the at least one gas outlet of the pyrolysis conduit segment to a condenser and condensing condensable pyrolysis gases to form a liquid pyrolysis product.

17. The method of claim 16, further comprising:
separating any non-condensed pyrolysis gases from the liquid pyrolysis product; and
purging the pyrolysis feedstock with the separated non-condensed pyrolysis gases.

18. The method of claim 16, wherein:
the condenser unit is at least one of a direct contact condenser and a static mixer having an eductor fluid delivery assembly.

19. The method of claim 13, further comprising:
introducing the exhausted pyrolysis gases from the at least one gas outlet of the pyrolysis conduit segment to a first condenser unit for condensing a portion of condensable pyrolysis gases to form a first liquid pyrolysis product;
separating any non-condensed pyrolysis gases from the first liquid pyrolysis product;
introducing the separated non-condensed pyrolysis gases into a second condenser unit for condensing the non-condensed pyrolysis gases to form a second liquid pyrolysis product, the second condenser unit being a static mixer having an eductor fluid delivery assembly.

20. The method of claim 13, wherein:
a solids conveyor is disposed within the solids return conduit segment to facilitate conveying solid materials from the discharged solids inlet through the solids return and combustion conduit segment toward the solids return outlet.

21. The method of claim 13, wherein:
the pyrolysis feedstock is biomass.

22. The method of claim 13, further comprising:
introducing the exhausted pyrolysis gases into a syngas reactor under suitable conditions to produce syngas from the exhausted pyrolysis gases; and optionally
contacting the syngas with a Fischer-Tropsch catalyst to produce a liquid hydrocarbon product.

* * * * *